United States Patent
Jo

(10) Patent No.: US 9,971,237 B2
(45) Date of Patent: May 15, 2018

(54) PORTABLE SCREEN FOR SETTING UP OUTDOORS TO DISPLAY IMAGES

(71) Applicant: In-Young Jo, Seoul (KR)

(72) Inventor: In-Young Jo, Seoul (KR)

( * ) Notice: Subject to any disclaimer, the term of this patent is extended or adjusted under 35 U.S.C. 154(b) by 0 days. days.

(21) Appl. No.: 15/414,067

(22) Filed: Jan. 24, 2017

(65) Prior Publication Data

US 2017/0131625 A1 May 11, 2017

Related U.S. Application Data

(63) Continuation of application No. PCT/KR2015/007076, filed on Jul. 8, 2015.

(30) Foreign Application Priority Data

Jul. 25, 2014 (KR) .................. 10-2014-0095066

(51) Int. Cl.
| | |
|---|---|
| *G03B 21/60* | (2014.01) |
| *G03B 21/58* | (2014.01) |
| *F16M 11/22* | (2006.01) |
| *G03B 21/56* | (2006.01) |
| *G03B 21/625* | (2014.01) |
| *G03B 21/62* | (2014.01) |

(52) U.S. Cl.
CPC ............. *G03B 21/58* (2013.01); *F16M 11/22* (2013.01); *G03B 21/56* (2013.01); *G03B 21/60* (2013.01); *G03B 21/62* (2013.01); *G03B 21/625* (2013.01)

(58) Field of Classification Search
CPC ...................................................... G03B 21/56
USPC ....................................................... 359/443
See application file for complete search history.

(56) References Cited

U.S. PATENT DOCUMENTS

| | | | | | |
|---|---|---|---|---|---|
| 2,357,819 | A | * | 9/1944 | Royden .................. | G03B 21/58 160/351 |
| 3,277,781 | A | * | 10/1966 | Moutray ................ | G03B 21/62 359/449 |
| 2017/0131625 | A1* | | 5/2017 | Jo .......................... | G03B 21/58 |

FOREIGN PATENT DOCUMENTS

| | | | | |
|---|---|---|---|---|
| JP | 10-97001 | A | 4/1998 | |
| JP | 2005-221609 | * | 8/2005 | ............. G03B 21/58 |
| JP | 2005-221609 | A | 8/2005 | |
| KR | 1998-061944 | A | 11/1998 | |
| KR | 20-2003-50802 | Y1 | 5/2004 | |
| KR | 200350802 | * | 5/2004 | ............. G03B 21/58 |
| KR | 10-2011-0083105 | A | 7/2011 | |

OTHER PUBLICATIONS

Designer : Wang Yan, http://www.tuvie.com/watch-movies-at-campsites-with-portable-camping-projector/, Tuvie—Modern Industrial Design Ideas and News, Saved 34 times between May 8, 2011 and Jul. 14, 2017.*

(Continued)

*Primary Examiner* — Clayton E Laballe
*Assistant Examiner* — Kevin Butler
(74) *Attorney, Agent, or Firm* — Jefferson IP Law, LLP

(57) ABSTRACT

A portable screen for setting up outdoors to display images projected thereonto from a beam projector and the like is provided. The portable screen being not only convenient to set up outdoors to be used, but additionally being stably supported to withstand even wind or external impact without easily collapsing to allow the image content to be comfortably viewed.

11 Claims, 10 Drawing Sheets

(56) References Cited

OTHER PUBLICATIONS

International Search Report, PCT/KR2015/007076, dated Nov. 6, 2015, 2 pages.*
Written Opinion International Search Authority, PCT/KR2015/007076, dated Nov. 6, 2015, 9 pages.*

* cited by examiner

PORTABLE SCREEN FOR SETTING UP OUTDOORS TO DISPLAY IMAGES

CROSS-REFERENCE TO RELATED APPLICATION(S)

This application is a continuation application, claiming the benefit under § 365(c), of an International application filed on Jul. 8, 2015 and assigned application number PCT/KR2015/007076, which claimed the benefit of a Korean patent application filed on Jul. 25, 2014 in the Korean Intellectual Property Office and assigned Serial number 10-2014-0095066, the entire disclosure of which is hereby incorporated by reference.

TECHNICAL FIELD

The present disclosure relates to a portable screen set up outdoors to display images projected from a beam projector and the like. More particularly, the present disclosure relates to a potable screen which is not only convenient to be set up outdoors to be used, but also stably supported to withstand even wind or external impact without moving of a sheet, thereby allowing an image to be comfortably viewed.

BACKGROUND

In general, a beam projector is a display device which implements a very large picture by projecting light radiated from a lamp on a screen. A beam project used indoors is installed on a bottom surface or fixedly installed to a ceiling and a screen is installed to be spaced apart from the beam projector by an interval, such that the image projected from the beam projector may be projected on the screen at a suitable size.

Meanwhile, in recent years, even a portable electronic device such as a smartphone or a digital camera employs a small volume of a beam projector module having high-intensity light source to confirm a video photographed thereby or easily utilize contents such as movies or animation, such that an enlarged image may be implemented by being projected on a screen, a wall, a paper, or fabrics, thereby confirming the image anytime.

Meanwhile, as the five-day workweek system becomes common, people enjoying outdoor activities or camping as leisure activities have been increased. People consume video contents by enjoying movies or allowing their children to watch animation at camping places.

However, since there is a limit in enjoying contents through an electronic device such as a smartphone, it is a problem that many people cannot together enjoy contents.

Thus, to enjoy contents together with many people, several people prepare a small-size electronic device in which a beam projector is embedded and a separate screen on which an image is projected. Then, after the screen is install to a geographical material such as a tree (KR 2019990024216 U), or installed using a screen support formed in a form of a triangular support to enjoy a video (KR 100832777 B1).

However, since geometric features at most of camping places or outdoor activity places are irregular, it may be often inconvenient to install a screen at such places. Even if there is a place at which the screen is installed, it is difficult to allow the screen to vertically stand up and to be evenly spread. Thus, there is a problem that the screen moves while enjoying movies as a geographic feature moves.

In addition, in even a case that the screen support formed in a form of a triangular support is used, since the structure is very unstable, the screen may easily fall down even when a moderate wind rises. Even though not falling down, the screen seriously rolls from side to side, so that it is difficult to enjoy contents.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable screen which can be easily prepared even at an outdoor place which is unsuitable to install the screen to enjoy, and have the center of gravity to be stable so that the screen has a stable installation structure to be stably supported without easily falling down even when a wind rises or external force is applied thereto.

In this case, the screen is prevented from shaking by a wind or external force while the screen is maintained to be tightly spread, so that a user enjoys contents without being disturbed.

Another aspect of the present disclosure is to provide a potable screen of which the assembly structure is simplified for the purpose thereof, such that the installing and uninstalling thereof is easy. If necessary, the portable screen is easily installed for use. The volume of the portable screen is minimized to be conveniently portable.

In accordance with an aspect of the present disclosure, a portable screen is provided. The portable screen includes a draping frame which stands upright and includes frame bars formed at upper, lower, left and right sides thereof, wherein the frame bars are connected to each other with edge connectors to be formed in a rectangular frame, a support frame including another frame bar connected to the draping frame such that the support frame extends in rear of the draping frame, and a screen sheet provided on a front surface of the draping frame such that an image is projected thereon.

In addition, the frame bars constituting the draping frame and the support frame are divided in a longitudinal direction and are pulled by elastic bands to elastically fix the frame bars, such that the frame bars are firmly assembled with each other without being arbitrarily separated from each other and a low part of the screen sheet is fixed while being downwardly pulled by an elastic element, thereby tightly spreading the screen sheet.

According to the portable screen of the present disclosure, during outdoor activity or camping, the screen can be easily installed for use at even a place where any geometric features do not exist to be unsuitable to install the screen, and, due to convenient installing and uninstalling, so that a user can install or uninstalls the screen for a short time by himself, so the portable screen can be very conveniently used.

In addition, even when a strong wind rises or the portable screen collides with the body of a walker so that external force is applied to the portable screen, since the portable screen does not fall down, the danger of a safety accident can be prevented and the expensive screen sheet can be prevented from being damaged in advance when the portable screen falls down.

In addition, since a state that the screen sheet is tightly pulled is maintained while enjoying video contents, an image can be prevented from being distorted or hidden, so that the user enjoys a high quality of video contents, thereby improving the satisfaction.

In addition, when the portable screen is uninstalled, since the volume of the portable screen is small, the portable screen is contained in a separate bag, so that the portable screen is conveniently portable. Further, since the keeping volume of the portable screen is not large, it is easy to load or keep the portable screen in a vehicle.

In addition, in an installing state of the portable screen, since clothes or articles for an outdoor activity may be kept while being hanged in rear of the screen sheet, the portable screen may be used for a variety of reasons outdoors where the keeping space is insufficient. In a case that articles are hanged on the portable screen, the center of gravity is placed in rear of the portable screen, so that the portable screen can be more stably used.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
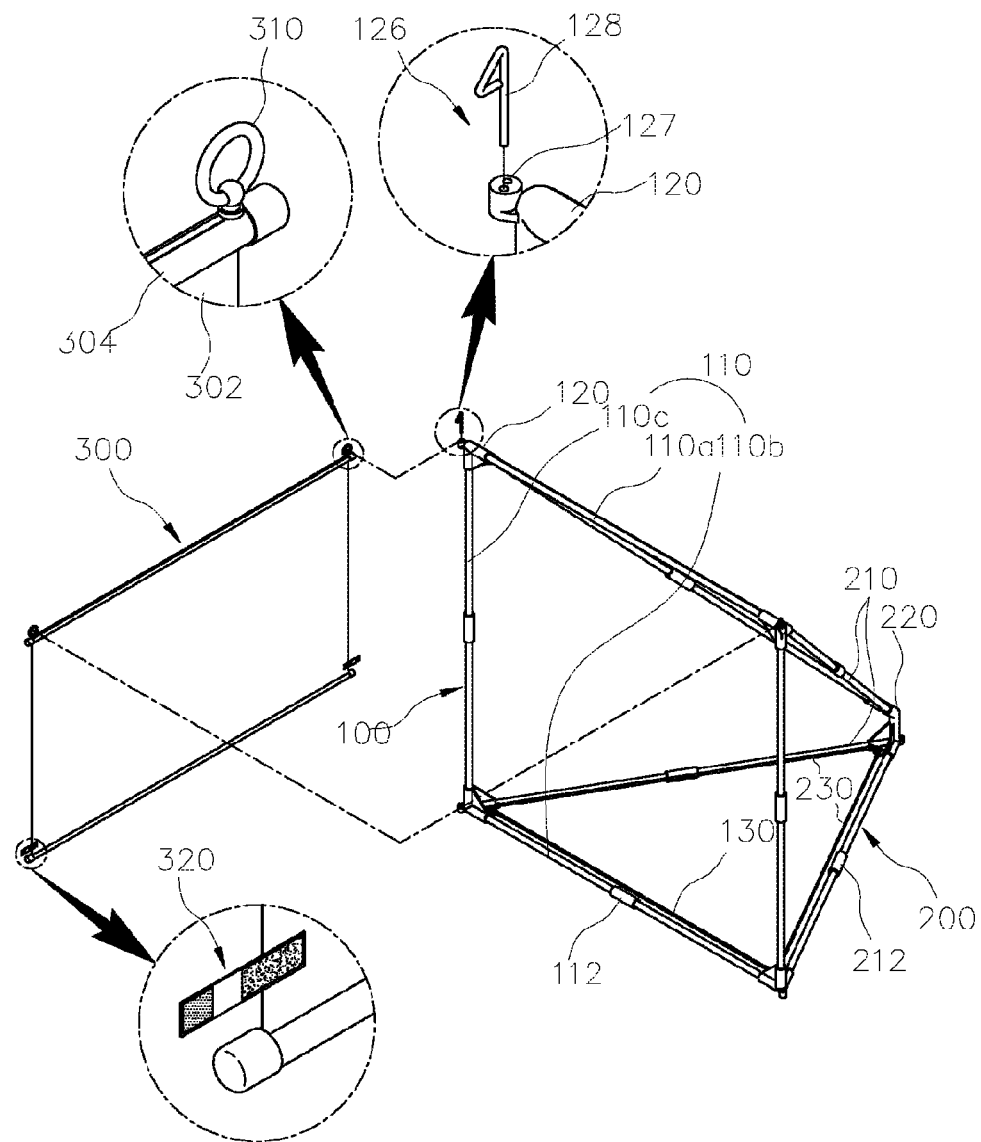
FIG. 1 is a perspective view showing a screen according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the best mode according to an embodiment of the present disclosure, a portable screen installed outdoors to display an image, is provided. The portable screen includes a draping frame 100 including upper and lower frame bars 110a and 110b, frame bars 110c, and edge connectors 120, wherein the frame bars 110c are arranged perpendicularly to sides of the upper and lower frame bars 110a and 110b to connect both ends of the upper frame bar 110a to both ends of the lower frame bar 110b through the frame bars 110c, the upper and lower frame bars 110a and 110b, and the frame bars 110c are connected to each other with the edge connectors 120 such that the draping frame 100 is formed in a rectangular shape, and the draping frame 100 stands vertically;

a support frame 200 including a frame bar 210 extending in rear of the draping frame 100, such that a center of gravity is induced downwardly; and a screen sheet 300 fixedly disposed on an upper end of the draping frame 100 while being downwardly spread such that an image is projected thereon.

Hereinafter, the present disclosure will be described in detail with reference to accompanying drawings as follows.

FIG. 1 is a perspective view showing a screen according to an embodiment of the present disclosure.

As shown in FIG. 1, a portable screen according to the present disclosure may include a draping frame 100 vertically standing, a support frame 200 for supporting the draping frame 100 in a state that the draping frame 100 vertically stands, and a screen sheet (300) provided on the draping frame 100 and on which an image is projected.

The draping frame 100 and the support frame 200 may include several frame bars 110 and 210 connected to each other, where each of the frame bars 110 and 210 are assembled with each other through edge connectors 120 and 220.

The draping frame 100, on which the screen sheet 300 is hanged to be fixed, has a structure, where frame bars 110c are arranged perpendicularly to sides of upper and lower frame bars 110a and 110b to connect both ends of the upper frame bar 110a to both ends of the lower frame bar 110b therethrough, the upper and lower frame bars 110a and 110b, and the frame bars 110c are connected to each other with the edge connectors 120, such that the draping frame 100 is formed in a rectangular frame, and the draping frame 100 stands vertically to be fixed.

The edge connector 120 includes an inserting socket 122 corresponding to a diameter of the frame bar to assemble the frame bars 110. The frame bars 110 may assembled with each other by inserting the frame bars 110 into the inserting sockets 122.

The inserting socket 122 is further formed in rear of the draping frame 100 to assemble the frame bar 210 of the support frame 200. The edge connector 220 for connecting the frame bars 210 of the support frame 200 to each other may be further formed, such that the edge connector 220 and the frame bars 210 are assembled in the same structure as that of the draping frame 100.

In this case, an angle of each of the inserting sockets 122 and 222 formed in the edge connectors 120 and 220 may be variously formed corresponding to a desired assembly form of the frame bars 110 and 210.

The draping frame 100 includes four edge connectors 120 assembled at both upper sides and both lower sides, respectively. Each of the four edge connectors 120 may have an inserting socket 122 such that the frame bars 210 of the support frame 200 are assembled with each other in rear of the draping frame 100. Alternatively, the inserting socket 122 may be selective formed in some of upper or lower ends of the edge connectors 120.

Preferably, the inserting sockets 122 may be formed in all the edge connectors 120 installed on four edges such that the frame bars 210 of the support frame 200 are assembled with each other.

The support frame 200 may hold the center of gravity such that the draping frame is prevented from falling down in the state that the draping frame vertically stands. The frame bars 210 are assembled to the edge connectors 120 of the draping frame 100 in rear of the draping frame 100, and the frame bars 210 are connected to the edge connectors 220 such that the center of gravity of the screen is located in rear of the screen.

Figure 2:
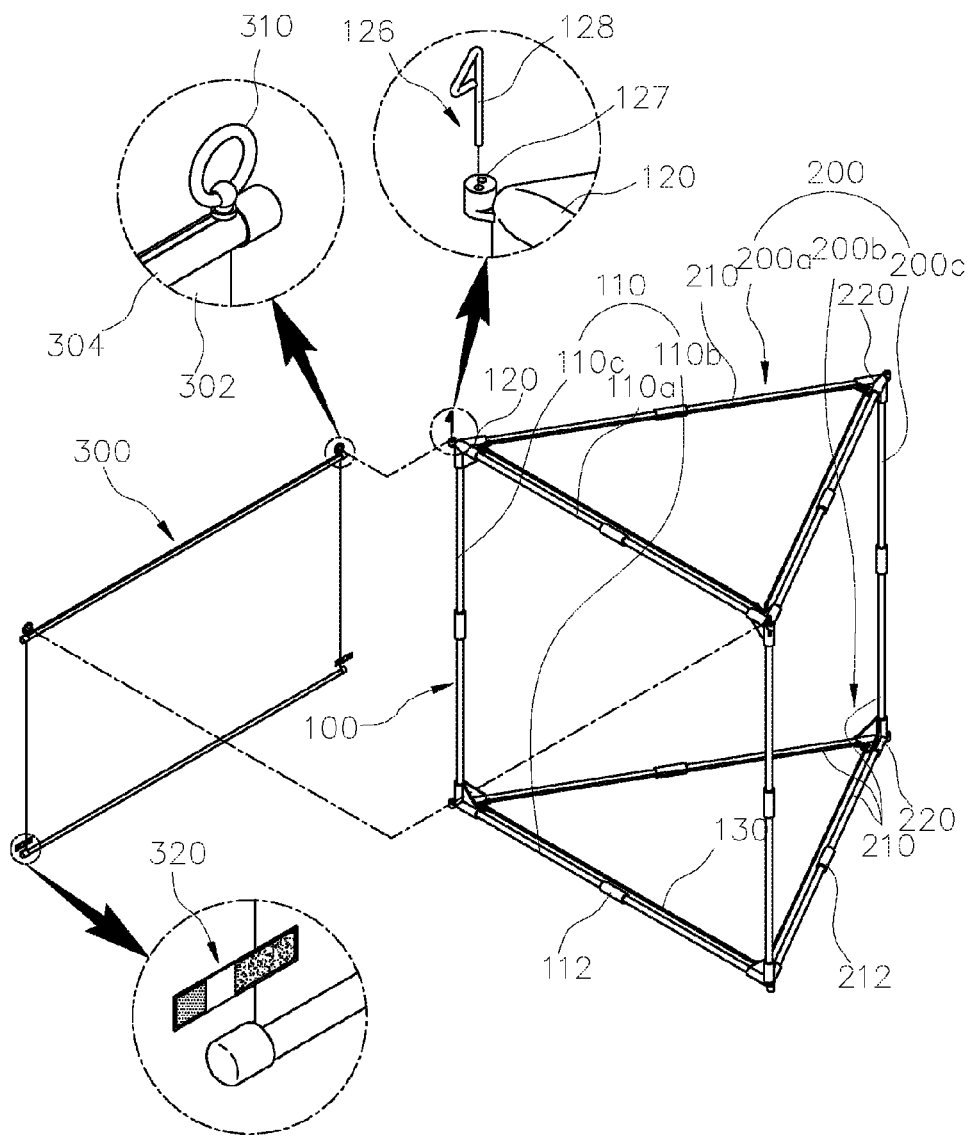
FIG. 2 is a perspective view showing a screen according to an embodiment of the present disclosure.
Figure 3:
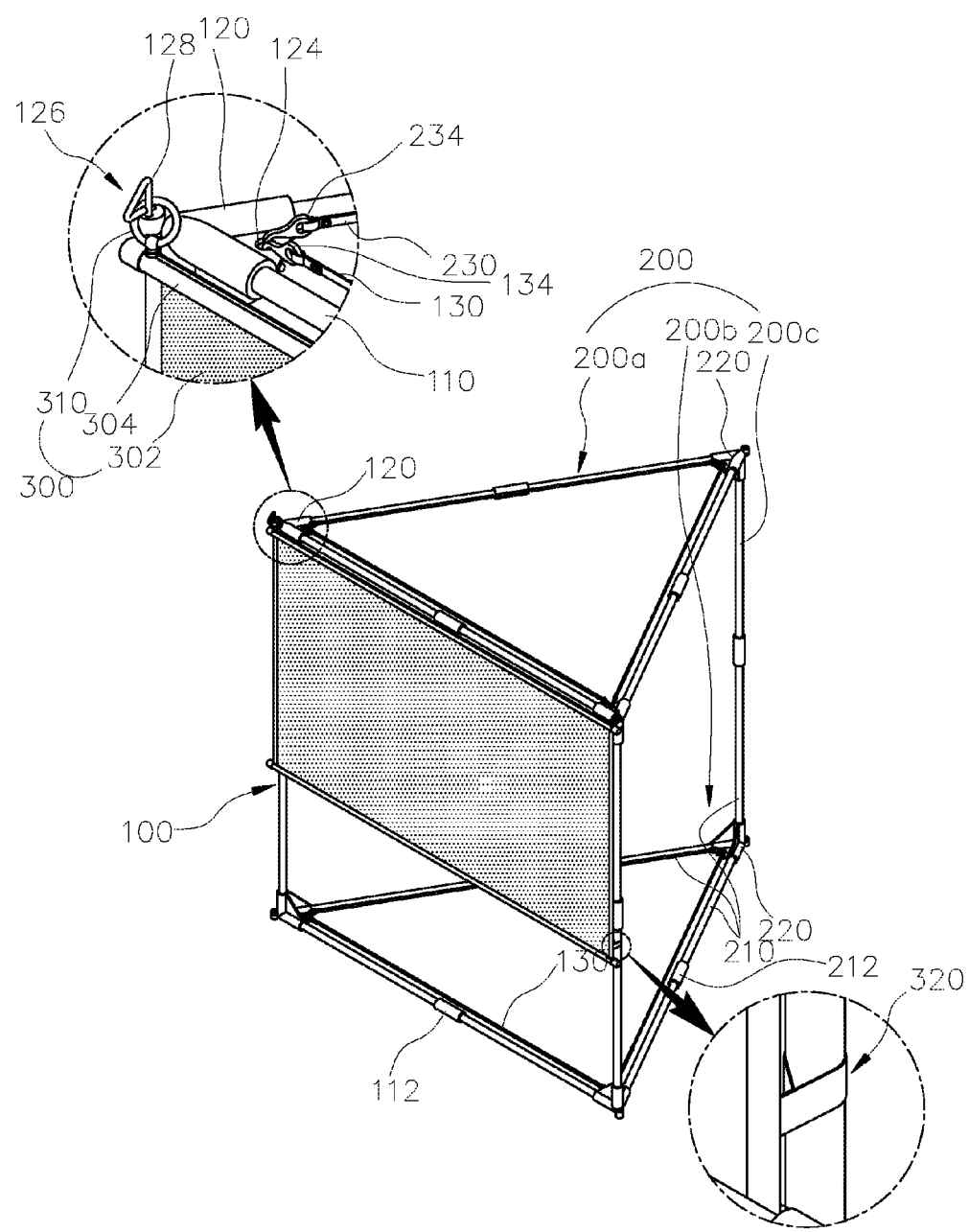
FIG. 3 is a perspective view showing a state of installing a screen according to an embodiment of the present disclosure.
Figure 4:
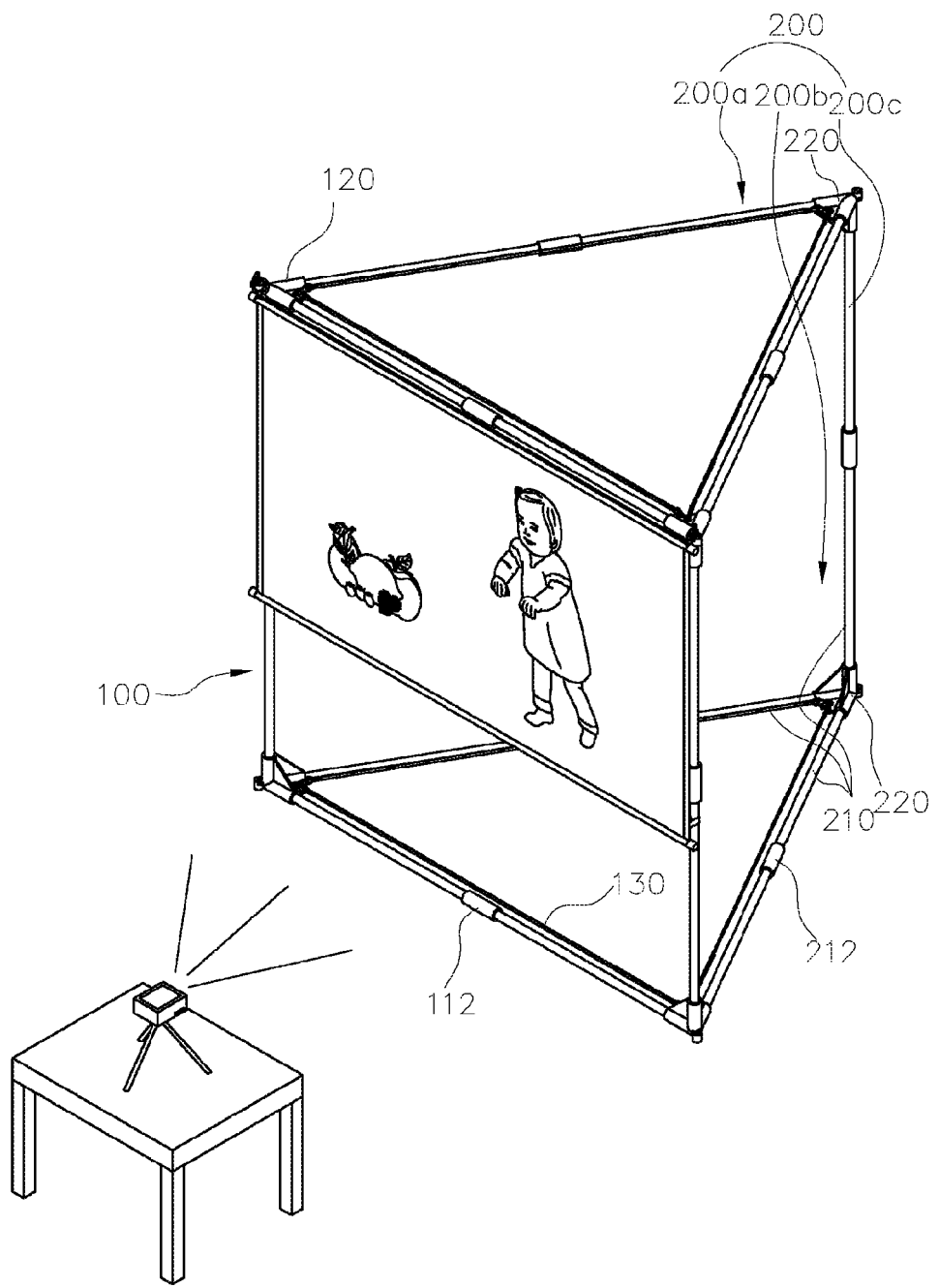
FIG. 4 is a view showing a state of using a screen according to an embodiment of the present disclosure.

FIG. 2 is a perspective view showing a screen according to an embodiment of the present disclosure, FIG. 3 is a perspective view showing a state of installing a screen according to an embodiment of the present disclosure, and FIG. 4 is a view showing a state of using a screen according to an embodiment of the present disclosure.

In this case, as shown in FIG. 1, the frame bars 210 assembled to be connected in rear of the draping frame 100 may be arranged to be concentrated on one position. Alternatively, as shown in FIG. 2, the frame bars 210, which are connected to two edge connectors 120 at the upper side of the draping frame 100, are connected to each other through the edge connector 220 to construct an upper frame 200a formed in a polygonal shape. In addition, the frame bars 210, which are connected to two edge connectors 120 at the lower side of the draping frame 100, are connected to each other through the edge connector 220 to construct a lower frame 200b formed in a polygonal shape. The upper and lower frames 200a and 200b may be assembled with each other to be vertically connected with each other by using a vertical frame bar 200c.

In this case, a camping article or another may be hanged on the upper frame 200a constituting the support frame 200 to be kept and to this end, a separate hanging ring (not shown) may be provided.

As configured above, when the upper and lower frames 200a and 200b are formed in a regular triangular shape, since all the frame bars 110 and 210 used for the draping frame 100 and the support frame 200 may have the same length and the edge connectors 220 may have the same shape or form, the manufacturing cost may be reduced. Even when the portable screen is installed, the portable screen may be easily assembled without any need to determine where a component is placed.

In addition, elastic bands 130 and 230 are installed to the frame bars 110 and 210 constituting the draping frame 100 and the support frame 200 to connect the edge connectors 120 and 220 to each other, such that the draping frame and the supporting frame may be elastically fixed to be prevented from being arbitrarily separated from each other.

Figure 5:
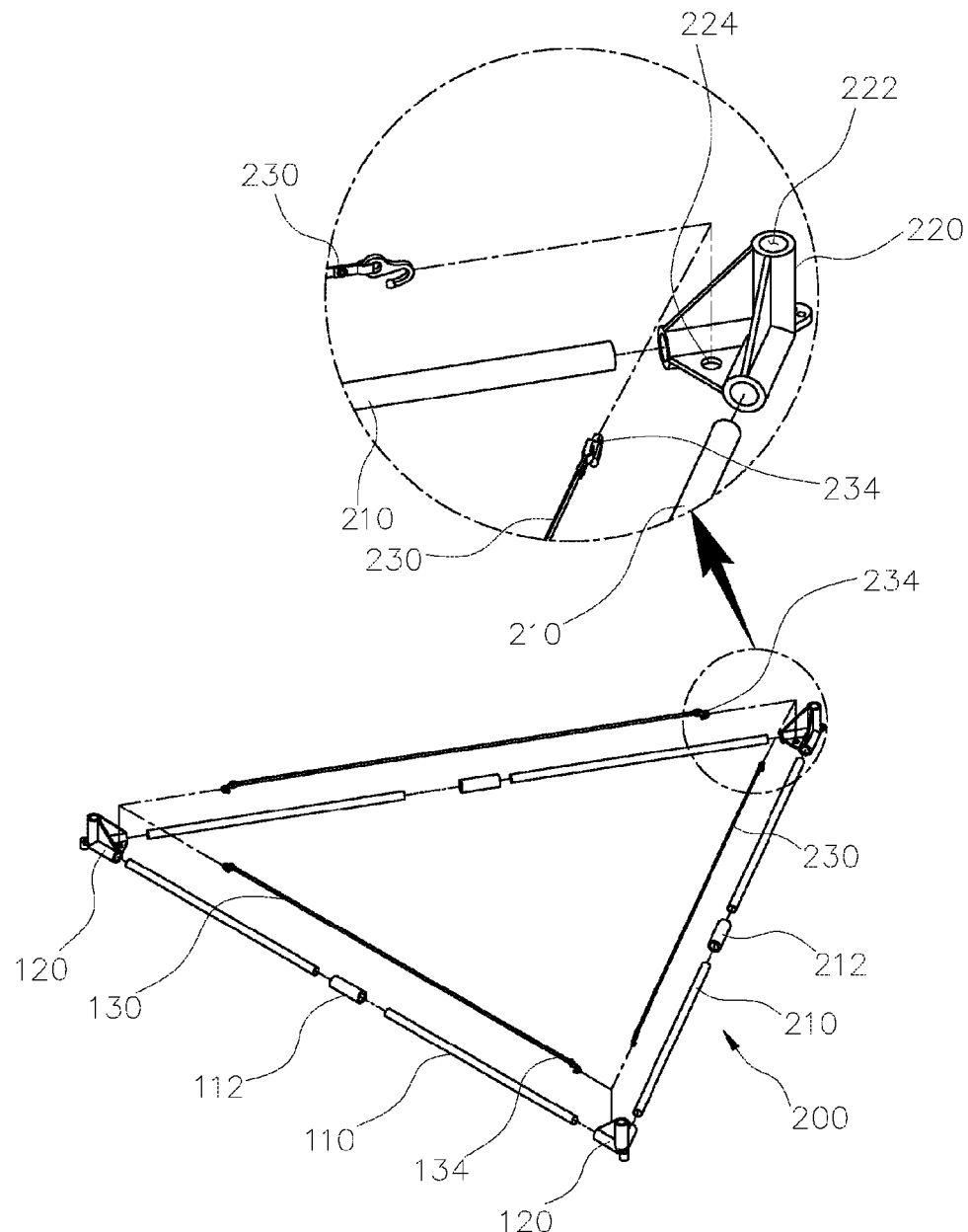
FIG. 5 is an exploded perspective view showing a frame assembly structure according to an embodiment of the present disclosure.
Figure 6:
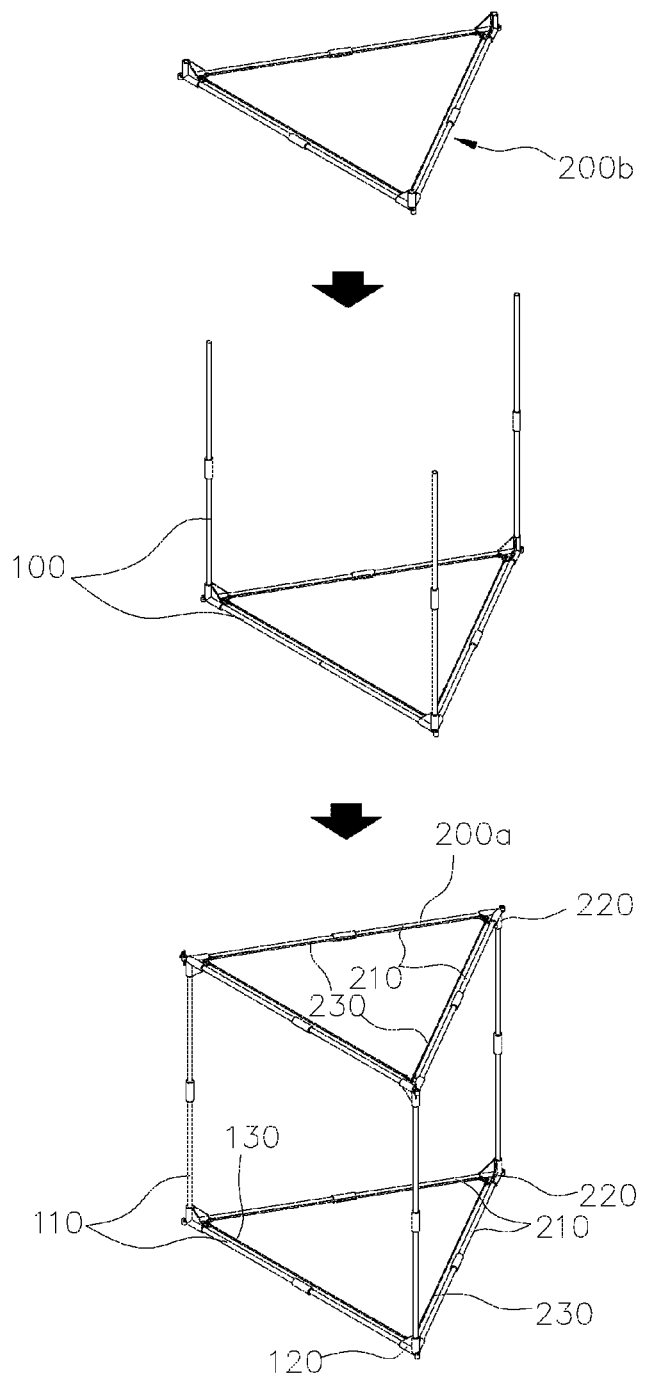
FIG. 6 is a flowchart illustrating a structure of installing a screen according to an embodiment of the present disclosure.

FIG. 5 is an exploded perspective view showing a frame assembly structure according to an embodiment of the present disclosure and FIG. 6 is a flowchart illustrating a structure of installing a screen according to an embodiment of the present disclosure.

As shown in FIG. 5, in the installing structure of the elastic bands 130 and 230, the edge connectors 120, 220 are formed with punched holes 124 and 224, and fixing members 134 and 234 are formed on both ends of the frame bars 110 and 210, such that the edge connectors assembled on both ends of the frame bars 110 and 210 are elastically fixed while pulling each other. Thus, in the assembled state of the draping frame 100 and the support frame 200, the frame bars are prevented from be arbitrarily released and easily separated from the edge connectors, so that the installing structure may be stably supported.

If the frame bar 110 or 210 is manufactured to be divided into at least two pieces in a longitudinal direction, when the portable screen is kept, the keeping volume may be reduced and easily portable.

The divided frame bars 110 and 210 are assembled with each other through the connecting sockets 112 and 212.

Figure 7:
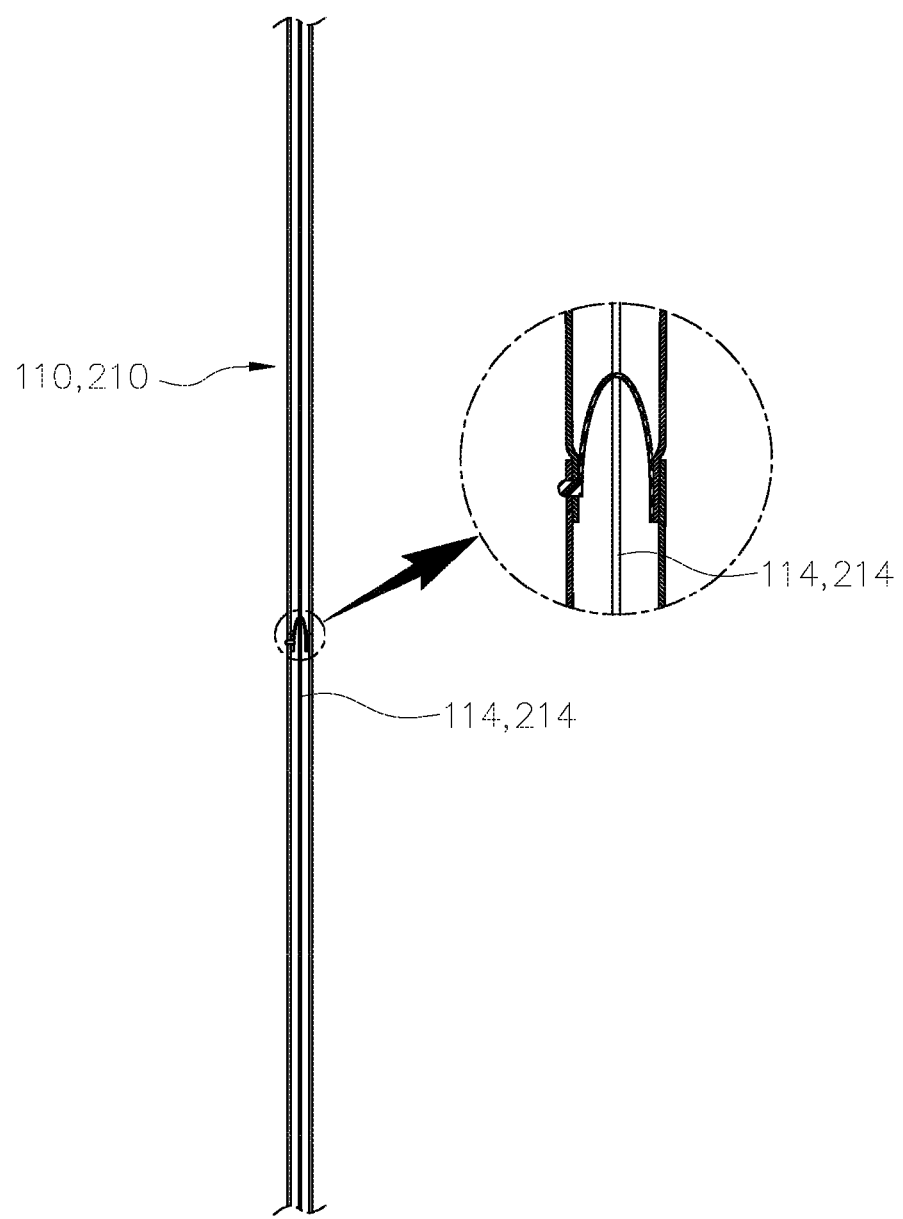
FIGS. 7 and 8 are substantial views showing a structure of folding a frame bar according to various embodiments of the present disclosure.
Figure 8:
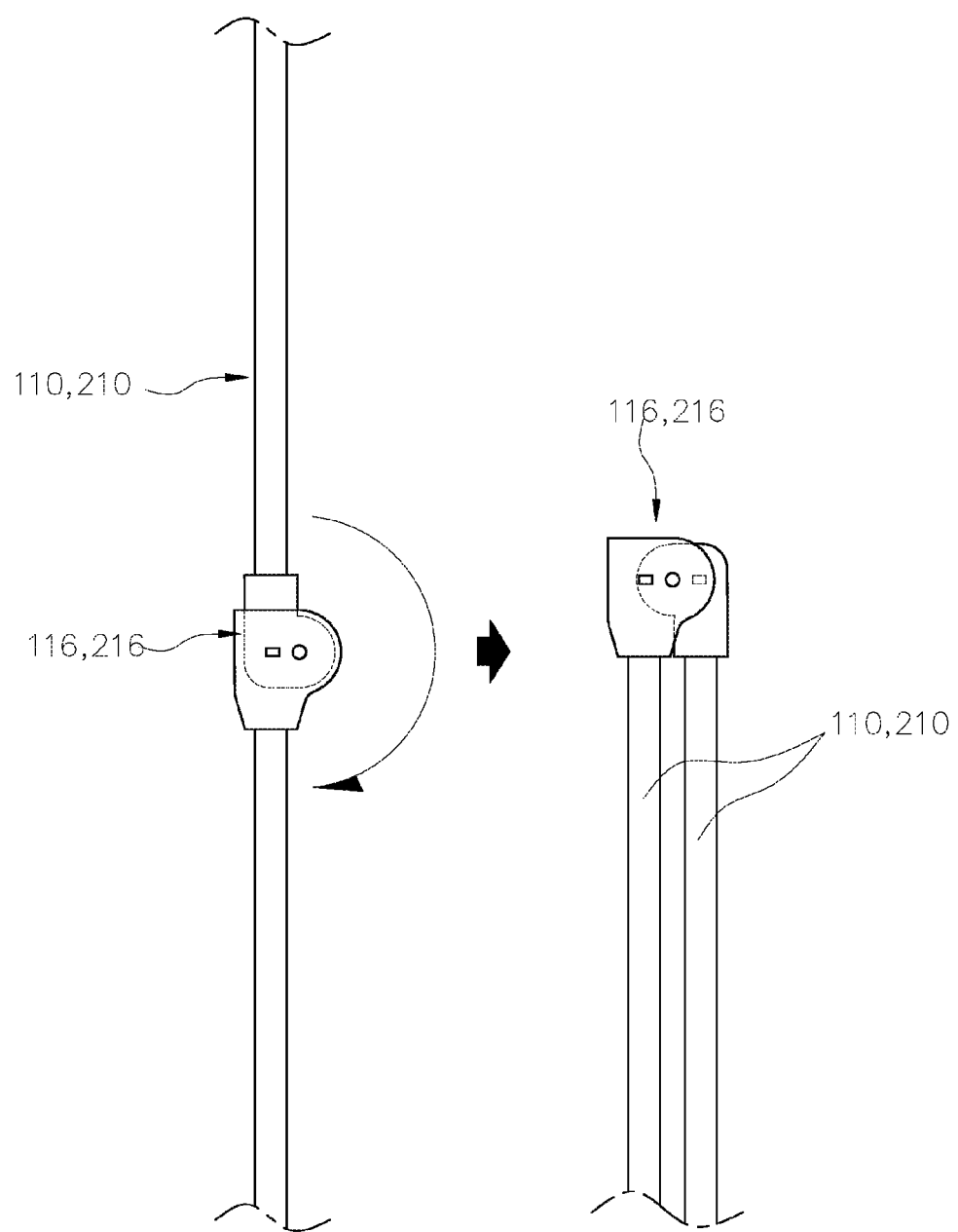

FIGS. 7 and 8 are substantial views showing a structure of folding a frame bar according to various embodiments of the present disclosure.

As shown in FIG. 7, the connecting structure of the divided frame bars 110 and 210 may be simply folded or unfolded by embedding elastic strings 114 and 214 in the frame bars 110 and 210. Alternatively, as shown in FIG. 8, after dividing the frame bars 110 and 210, folding elements 116 and 216 are installed to the connecting portions, such that the frame bar may be unfolded in a folding type to be installed or may be folded to be kept.

Meanwhile, the screen sheet 300 may be provided on the front surface of the draping frame 100 while being spread such that an image is projected thereon. Horizontal bars 304 are installed on upper and lower sides of a functional sheet 302 such that the screen sheet 300 may be provided while being spread and wound to be kept.

In the structure of providing the screen sheet 300 to the draping frame 100, a hanging part 126 is provided to an upper end of the draping frame 100, and a hanging ring 310 may be formed on an upper portion of the screen sheet 300 to be fixedly hanged.

In this case, preferably, in the hanging part 126, a fitting hole 127 is formed in the edge connector 120 and a hanging member 128 is inserted into a punched hole 128 such that the screen sheet may be fixedly hanged.

Preferably, the screen sheet 300 may be provided in front of the draping frame 100. The horizontal bar 304 constituting the screen sheet 300 may be formed to have a length relatively longer than the interval between both side frame bars 110c of the draping frame 100, such that the screen sheet 300 is tightly provided in front of the draping frame 100 while the horizontal bar 304 is supported by both side frames 100c.

In addition, since the screen sheet 300 is provided to be tightly closed to the draping frame 100 by the horizontal bar

304 without any units for fixing the screen sheet 300, the screen sheet 300 may be stably maintained in a folded state.

As a unit for preventing the screen sheet 300 from moving, a fixing band 320 may be further formed on a lower portion of the screen sheet 300.

The fixing band 320 may be wound around the frame bar 110 of the draping frame 100 and fixed to the frame bar 110 of the draping frame 100 by installing the fixing band 320 to the functional sheet 302 or the horizontal bar 304. In this case, a Velcro-fastener or a snap button may be used as the coupling structure of the fixing band 320.

Figure 9:
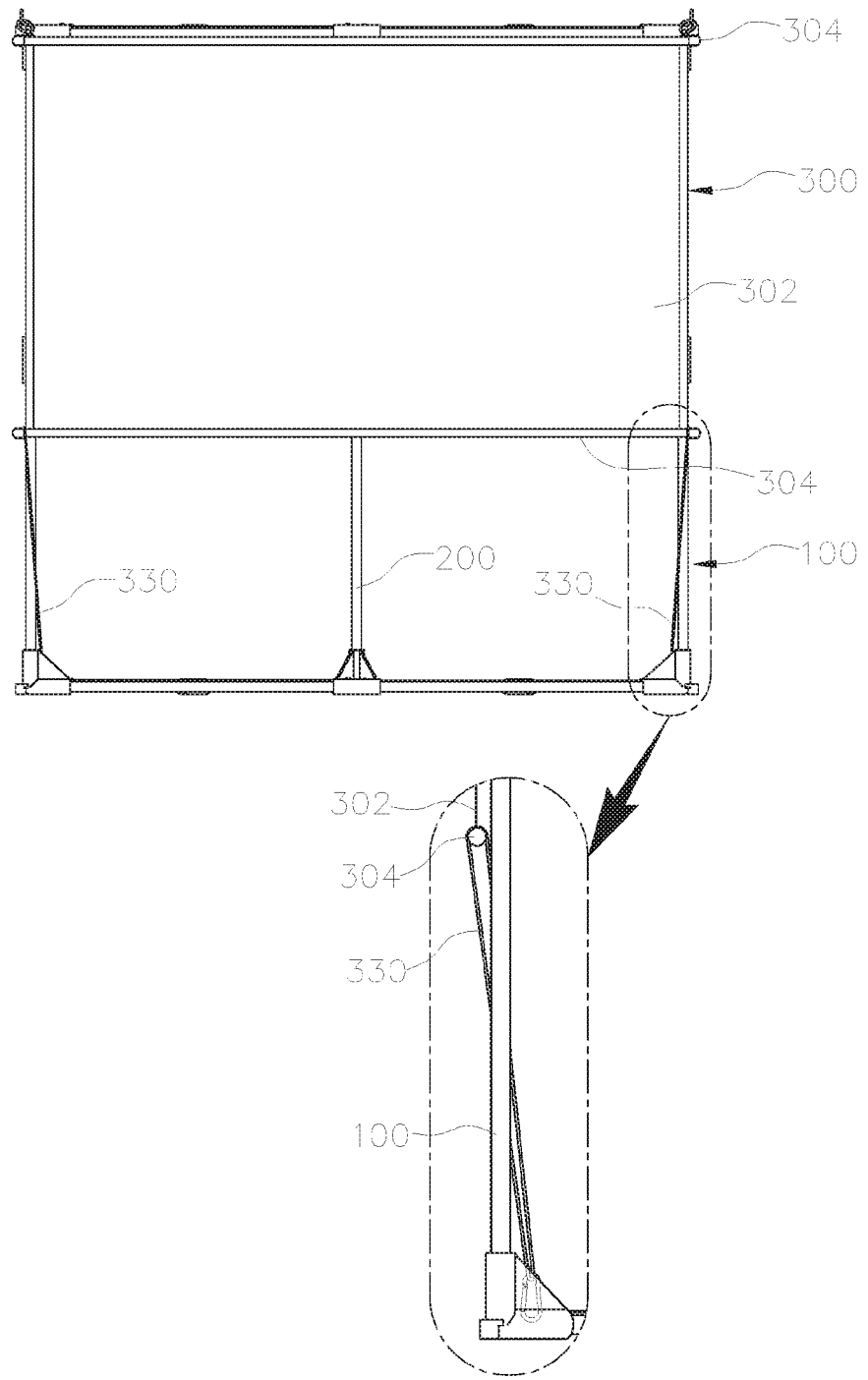
FIGS. 9 and 10 are views showing a state that a screen sheet is deployed and fixed while being pulled downwardly by an elastic element according to various embodiments of the present disclosure.
Figure 10:
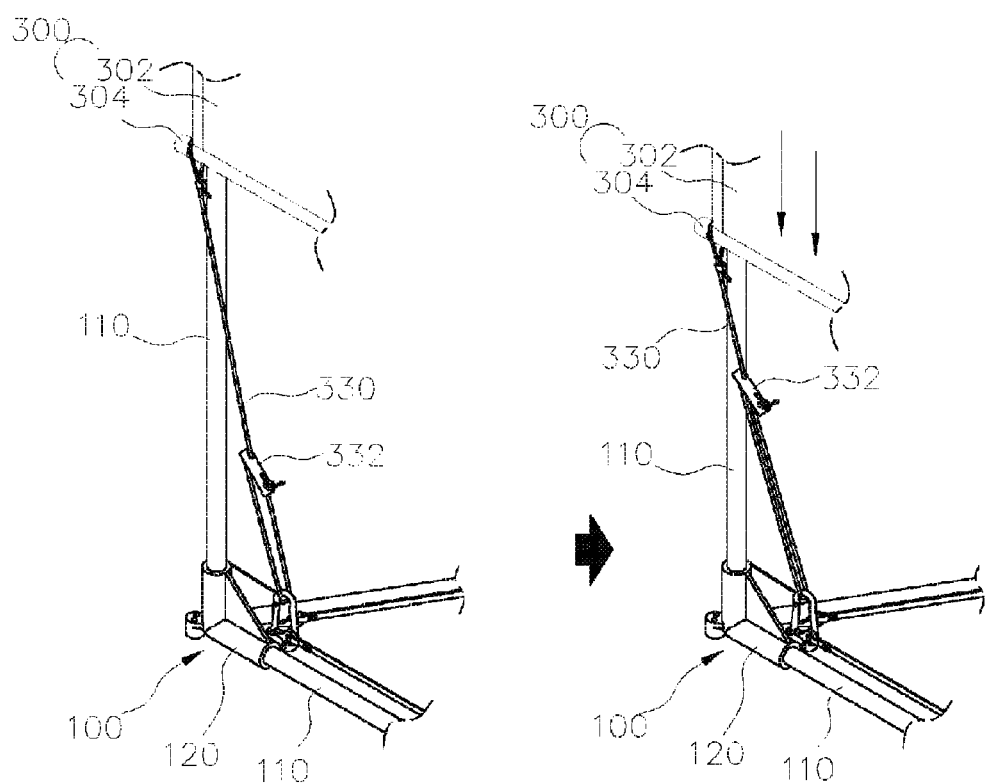

FIGS. 9 and 10 are views showing a state that a screen sheet is deployed and fixed while being pulled downwardly by an elastic element according to various embodiments of the present disclosure.

As shown in FIGS. 9 and 10, as another unit for further preventing the screen sheet 300 from moving, an elastic element 330 for fixing the horizontal bar 304 of the screen sheet 300 by downwardly pulling the horizontal bar 304 of the screen sheet 300 may be used.

When one end of the elastic element 300 is installed to two edge connectors 120 formed on a lower end of the draping frame 100, and the opposite end of the elastic element 300 is fixed to both ends of the horizontal bar 304 formed on a low portion of the screen sheet 300, the functional sheet 302 is downwardly pulled by the elastic element 330 to be fixed, so that the screen sheet 300 may be stably maintained in a tightly spread state.

In this case, as a material of the elastic element 330, various materials having elasticity such as a rubber band or a silicon ring may be used.

When the low part of the screen sheet 300 is downwardly pulled by using the elasticity of the electric element 330, the screen sheet 300 may be tightly spread and may be stably maintained in a spread state without moving due to elasticity.

In addition, as shown in FIG. 10, when the elastic element 330 is provided with a length adjustment member 332, the length of the elastic element 330 may be adjusted. When tension of the elastic element 330 is adjusted or the installing height of the screen sheet 300 is high or low, the length may be adjusted to correspond to it. Alternatively, when screen sheets having various sizes are compatibly provided, the length of the elastic element 330 may be adjusted corresponding to the screen size.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable screen configured to be installed outdoors to display an image, the portable screen comprising:
   a draping frame which stands upright, the draping frame comprising:
      first upper frame bar and first lower frame bar,
      first frame bars vertically installed at both sides of the upper and lower frame bars to connect both ends of the first upper frame bar to both ends of the first lower frame bar, and
      first edge connectors for connecting the first upper and first lower frame bars with the first frame bars such that the draping frame is formed as a rectangular frame;
   a support frame comprising a second frame bar extending rearward of the draping frame to induce a center of gravity in a downward direction; and
   a screen sheet fixedly disposed on an upper end of the draping frame while being downwardly spread such that an image is projected thereon,
   wherein the draping frame is formed with a hook part for fixing the screen sheet to at least one of the first edge connectors and the screen sheet is formed with a hanging ring for hanging the screen sheet on the hook part,
   wherein the screen sheet comprises horizontal bars formed on upper and lower ends of a functional sheet,
   wherein each of the horizontal bars has a length longer than an interval between the first frame bars of the draping frame,
   wherein the horizontal bars are tightly fixed to the first frame bars,
   wherein the horizontal bar placed on a lower position is fixedly maintained while being pulled downward by an elastic element connected to the first edge connector placed on a lower end of the draping frame, such that the screen sheet is tightly spread, and
   wherein the elastic element is provided with a length adjustment member for adjusting a length of the elastic element.

2. The portable screen of claim 1,
   wherein the support frame comprises a plurality of second frame bars which are assembled to the edge connectors of the draping frame rearward of the draping frame, and
   wherein the plurality of second frame bars are connected by second edge connectors, such that the center of gravity of the portable screen is located rearward.

3. The portable screen of claim 2, further comprising:
   elastic bands for connecting the first frame bars and the plurality of second frame bars of the draping frame and the support frame to each other such that the draping frame and the support frame are elastically fixed to each other without being unintentionally separated from each other.

4. The portable screen of claim 2, wherein the draping frame is formed with a hook part for fixing the screen sheet to at least one of the first edge connectors and the screen sheet is formed with a hanging ring for hanging the screen sheet on the hook part.

5. The portable screen of claim 1, wherein the support frame further comprises:
   an upper frame comprising a plurality of second frame bars connected to two of the first edge connectors placed at an upper side of the draping frame and connected to each other with a second edge connector such that the second upper frame is formed in a polygonal shape,
   a lower frame comprising the plurality of second frame bars connected to two of the first edge connectors placed at a lower side of the draping frame and connected to each other with the second edge connector such that the lower frame is formed in a polygonal shape, and
   a vertical frame bar for vertically connecting the upper and lower frames to each other.

6. The portable screen of claim 5, further comprising:
   elastic bands for connecting the first frame bars and the plurality of second frame bars of the draping frame and the support frame to each other such that the draping frame and the support frame are elastically fixed to each other without being unintentionally separated from each other.

7. The portable screen of claim 5, wherein the draping frame is formed with a hook part for fixing the screen sheet to at least one of the first edge connectors and the screen sheet is formed with a hanging ring for hanging the screen sheet on the hook part.

8. The portable screen of claim 1, further comprising:
elastic bands for connecting the first frame bars and the second frame bar of the draping frame and the support frame to each other such that the draping frame and the support frame are elastically fixed to each other without being unintentionally separated from each other.

9. The portable screen of claim 8, further comprising:
a plurality of second edge connectors,
wherein the elastic bands are provided on both ends thereof with fixing members, respectively, and
wherein the first and the second edge connectors are provided with punched holes, respectively, such that the first and the second edge connectors are elastically fixed while being pulled from each other.

10. The portable screen of claim 9, wherein the first frame bars and the second frame bar are divided in a longitudinal direction thereof and assembled by connecting sockets, respectively.

11. The portable screen of claim 1, wherein the screen sheet is formed on both side surfaces thereof with fixing bands for fixing the first frame bars and the second frame bar of the draping frame while surrounding the first and the second frame bars, such that the screen sheet is prevented from moving.

* * * * *